Aug. 24, 1948.  R. W. SCHUCK  2,447,671
HIGH-SPEED BEARING
Filed Nov. 13, 1945
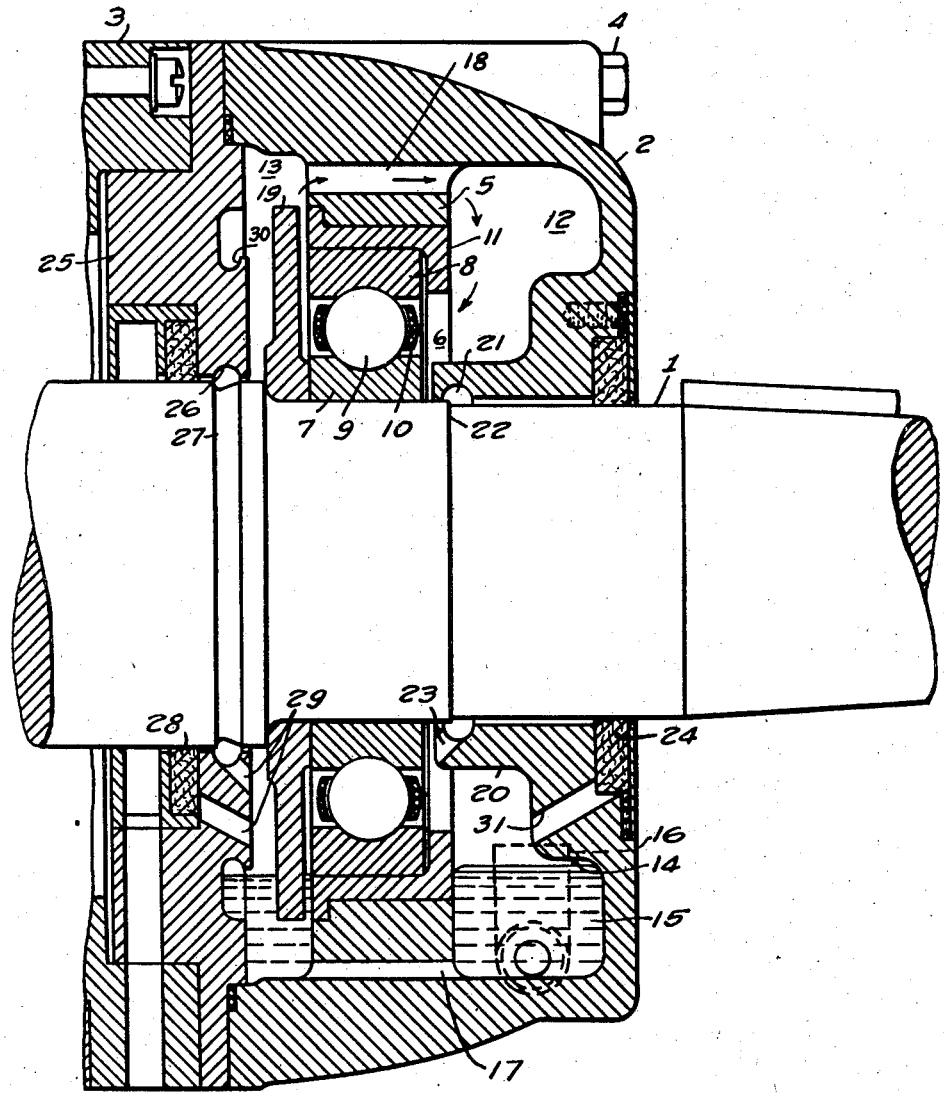
WITNESSES:
INVENTOR
Raymond W. Schuck.
BY
ATTORNEY

Patented Aug. 24, 1948

2,447,671

UNITED STATES PATENT OFFICE

2,447,671

HIGH-SPEED BEARING

Raymond W. Schuck, Pittsburgh, Pa., assignor to Westinghouse Electric Corporation, East Pittsburgh, Pa., a corporation of Pennsylvania Application November 13, 1945, Serial No. 628,290

4 Claims. (Cl. 308—187)

The present invention relates to high-speed bearings and, more particularly, to the lubrication of high-speed anti-friction bearings.

Ball or roller bearings which operate at high speeds, such as 10,000 R. P. M. or higher, are best lubricated by means of oil. At these high speeds, it is important for the oil to be used in the most effective manner, to provide proper lubrication, and it is necessary to avoid any substantial excess of oil over that actually needed. At high speeds, churning and splashing of excess oil in the bearing generates considerable heat and may cause overheating of the bearing, and the impact of the excess oil against the bearing retainer may be great enough to damage the retainer and thus cause failure of the bearing. For these reasons, it is desirable to utilize oil mist lubrication for high-speed anti-friction bearings, the oil being supplied to the bearing in the form of a mist or spray. This may be done by means of an oil ring on the shaft adjacent the bearing, but the use of an oil ring has the disadvantage of requiring a relatively large housing in order to accommodate a ring of the necessary diameter.

The principal object of the present invention is to provide a high-speed anti-friction bearing construction in which the bearing is effectively lubricated by means of an oil mist or spray, and in which no substantial excess of oil over that actually needed is supplied to the bearing.

A further object of the invention is to provide a simple and reliable construction for high-speed anti-friction bearings in which the bearing is lubricated by means of an oil mist or spray provided by an oil thrower on the shaft, so as to permit the use of a smaller housing than would be possible if an oil ring were used, and in which only enough oil is supplied to the oil thrower to provide adequate lubrication for the bearing, but without any substantial excess of oil.

Other objects and advantages of the invention will be apparent from the following detailed description, taken in connection with the accompanying drawing, the single figure of which is a longitudinal sectional view of a high-speed anti-friction bearing embodying the invention.

The invention is illustrated in the drawing embodied in a bearing assembly for supporting a rotatable shaft 1. The assembly includes a bearing housing 2 which is secured to a supporting structure 3 in any suitable manner, as by screws 4. The housing 2 is hollow and has an internal annular wall portion 5 with a central opening to receive the bearing. The bearing 6 is shown as a ball bearing, although it will be understood that the invention is equally applicable to roller bearings. As shown, the bearing has an inner race 7, which is pressed on the shaft 1, or otherwise secured to the shaft, and an outer race 8, with a row of balls 9 between the races 7 and 8, the balls 9 being held in position by a retainer or cage 10 of any usual construction. The bearing 6 also includes a cartridge or adaptor member 11 in which the outer race 8 is secured, and the cartridge 11 is mounted in the central opening of the wall portion 5 of the housing 2.

It will be seen that the wall portion 5 of the housing 2 and the bearing 6 divide the interior of the housing transversely into two annular chambers 12 and 13. The lower part of the annular chamber 12 is formed to provide an oil reservoir 14, which is kept filled with oil 15 to a predetermined level in any suitable manner, as by means of an oiler 16. A restricted opening 17 extends through the wall portion 5 of the housing 2 at the bottom of the housing to permit a limited amount of oil 15 to flow from the reservoir 14 into the lower part of the other annular chamber 13. A larger opening 18 extends through the upper part of the wall portion 5 to provide communication between the top parts of the two chambers 12 and 13. An oil thrower 19 is mounted on the shaft 1 in the chamber 13 adjacent the bearing 6. The oil thrower 19 may be of any suitable type, and is shown as being a disk member of large enough diameter to extend into the oil in the lower part of the chamber 13.

The outer end of the housing 2 is closed and has a central inwardly extending portion 20 which surrounds the shaft 1 with a small clearance. The shaft 1 has an oil-throwing shoulder 22 positioned in an annular chamber 21 in the portion 20 of the housing to prevent the escape of oil from the housing, oil caught in the chamber 21 draining to the reservoir 14 through a passage 23. A felt gasket 24 may be provided at the outer end of the housing 2 to catch any oil which may get past the chamber 21, and a passage 31 is provided to permit oil caught by the gasket 24 to drain into the reservoir.

The other end of the bearing housing 2 is closed by an annular cap member 25, which is interposed between the housing 2 and the supporting structure 3. The cap member 25 fits closely around the shaft 1, and the escape of oil along the shaft is prevented by sealing means similar to those at the opposite end of the housing, including an annular chamber 26 surrounding an oil-throwing shoulder 27 on the shaft, and a felt gasket 28, with passages 29 to permit oil caught by the sealing means to drain to the bottom of the chamber 13.

When the shaft 1 is rotating, the oil thrower 19, which rotates with the shaft and dips into the oil in the bottom of the chamber 13, throws the oil off in a spray or mist which fills the chamber 13. The fan action of the rapidly rotating oil thrower 19 produces air currents which carry the oil mist through the passage 18 into the chamber 12, so that the action of the oil thrower 19 causes both chambers 12 and 13 to be substantially filled with oil mist or spray, which is carried into the bearing 6 to lubricate the bearing, the circulation of the oil mist being generally indicated by arrows on the drawing. Oil which strikes the walls of the chambers 12 and 13 without being carried into the bearing drains to the reservoir 14 and to the bottom of the chamber 13. This oil is prevented from dripping onto the shaft 1 by the portion 20 of the housing and by a gutter 30 formed in the cap member 25.

Oil from the reservoir 14 flows through the restricted opening 17 into the bottom of the chamber 13 to provide a continuous supply of oil to the oil thrower 19. The opening 17 is restricted so that only a limited amount of oil is permitted to flow into the chamber 13, and thus the oil level in the chamber 13 during operation is controlled so that the oil thrower does not dip too deeply into the oil, and thus does not supply any substantial excess of oil to the bearing 6. When the shaft is at rest, the oil level in the chamber 13 will, of course, be the same as that in the reservoir 14, as shown in the drawing. When the shaft is rotating at high speed, however, the oil thrower 19 will at first withdraw oil from the bottom of the chamber 13 at a faster rate than oil can flow into it through the restricted passage 17, so that the oil level will be lowered until an equilibrium is reached between the amount of oil withdrawn by the oil thrower and the amount of oil which enters through the restricted opening 17. By making the opening 17 of the proper size, the oil level in the chamber 13 during operation can be quite accurately controlled, and thus the amount of oil supplied to the bearing can be made just enough for adequate lubrication without any substantial excess.

It should now be apparent that a high-speed anti-friction bearing construction has been provided in which effective oil mist lubrication is provided for the bearing without the use of an oil ring, so that a housing of relatively small diameter can be used, and in which the bearing is effectively lubricated without any substantial excess of oil. A preferred embodiment of the invention has been illustrated and described, but it is to be understood that various other embodiments and constructions may be used within the scope of the invention, and it is not restricted, therefore, to the particular details of construction shown, but in its broadest aspects it includes all equivalent modifications and embodiments which come within the scope of the appended claims.

I claim as my invention:

1. In combination, a bearing housing, an anti-friction bearing in said housing, a rotatable shaft supported in said bearing, oil-throwing means on the shaft within the housing adjacent one side of the bearing, an oil reservoir in the lower part of the housing at the other side of the bearing, means for supplying a limited amount of oil from said oil reservoir to the lower part of the housing adjacent said oil-throwing means, and means for causing oil thrown off said oil-throwing means to be carried into the bearing in the form of a mist.

2. In combination, a bearing housing, an anti-friction bearing in the housing, said bearing dividing the housing transversely into two chambers, a rotatable shaft supported in the bearing, an oil thrower on the shaft in one of said chambers adjacent the bearing, the other of said chambers including an oil reservoir in the lower part thereof, means for supplying a limited amount of oil from said oil reservoir to the lower part of the first-mentioned chamber in contact with said oil-thrower, and means for permitting oil thrown off by the oil-thrower to pass back to the second-mentioned chamber and into the bearing.

3. In combination, a bearing housing, said housing having an internal annular wall portion, an anti-friction bearing mounted in said wall portion, said wall portion and bearing dividing the housing transversely into two chambers, a rotatable shaft supported in the bearing, an oil thrower on the shaft in one of said chambers adjacent the bearing, the other of said chambers including an oil reservoir in the lower part thereof, means for supplying a limited amount of oil from said oil reservoir to the lower part of the first-mentioned chamber in contact with said oil-thrower, and means for permitting oil thrown off by the oil-thrower to pass back to the second-mentioned chamber and into the bearing.

4. In combination, a bearing housing, said housing having an internal annular wall portion, an anti-friction bearing mounted in said wall portion, said wall portion and bearing dividing the housing transversely into two chambers, a rotatable shaft supported in the bearing, an oil thrower on the shaft in one of said chambers adjacent the bearing, the other of said chambers including an oil reservoir in the lower part thereof, said wall portion having a restricted opening in the lower part thereof to permit a limited amount of oil to flow from said oil reservoir to the lower part of the first-mentioned chamber in contact with said oil-thrower, and said wall portion also having an opening in the upper part thereof to permit oil thrown off by the oil-thrower to pass back to the second-mentioned chamber and into the bearing.

RAYMOND W. SCHUCK.

REFERENCES CITED

The following references are of record in the file of this patent:

UNITED STATES PATENTS

| Number | Name | Date |
| --- | --- | --- |
| 1,607,222 | Wallgren | Nov. 16, 1926 |
| 1,638,959 | Pruger | Aug. 16, 1927 |
| 1,865,088 | Daun et al. | June 25, 1932 |
| 2,000,581 | Coffin et al. | May 7, 1935 |
| 2,255,662 | Gulew | Sept. 9, 1941 |